United States Patent Office 3,127,448
Patented Mar. 31, 1964

---

3,127,448
METHOD FOR PREPARING TERTIARY AMINE BORANES
Alfred A. Hinckley, Beverly, Mass., assignor to Metal Hydrides Incorporated, Beverly, Mass., a corporation of Massachusetts
No Drawing. Filed Sept. 21, 1960, Ser. No. 57,370
6 Claims. (Cl. 260—583)

This invention relates to the preparation of tertiary amine boranes.

A method for the preparation of tertiary amine boranes is described in British Patent No. 822,229. In accordance with this method, a tertiary amine is reacted with an alkali metal borohydride, an acid and water in the presence of an inert organic solvent which is immiscible or only partially miscible with water. The amount of water used is of the order of about 20 moles of water per mole of alkali metal borohydride. The amount of inert organic solvent used is about equal in volume to the amount of water used and serves as a solvent for the produced tertiary amine borane. Since it is well known that alkali metal borohydrides are hydrolyzed and decomposed by water and the rate of decomposition is increased if an acid also is present, the inert organic solvent appears to serve also to decrease the normal rate of decomposition of the alkali metal borohydride due to the presence of water and acid in the reaction mixture.

I have discovered that tertiary amine boranes may be prepared in good yield and purity by the reaction of an alkali metal borohydride, a tertiary amine, an acid and a relatively small amount of water in the absence of an inert organic solvent. The reaction is illustrated by the equation:

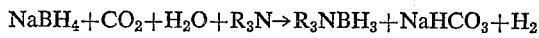
$$NaBH_4 + CO_2 + H_2O + R_3N \rightarrow R_3NBH_3 + NaHCO_3 + H_2$$

where R represents a lower alkyl radical, such as methyl, ethyl, propyl, isopropyl, and butyl radicals, or a lower cyclo-alkyl radical, such as cyclohexyl, cyclopropyl, cyclobutyl and cyclopentyl radicals. The tertiary amine is used in an amount substantially in excess of the amount theoretically required by the above equation, the excess serving as a solvent for the tertiary amine borane as it is formed. The molar ratio of acid to alkali metal borohydride should not exceed about 1 to 1. The molar ratio of water to alkali metal borohydride should not exceed about 3 to 1. In contrast, the molar ratio of water to alkali metal borohydride used in the method of the above mentioned British patent is of the order of 20 to 1.

In the practice of the invention, the reactants are mixed and agitated until the evolution of hydrogen ceases which indicates that the reaction is completed. The temperature used is not critical but the reaction mixture should be maintained below the boiling temperature of the tertiary amine.

It is preferred to use a mild acid, such as carbon dioxide, formic acid, acetic acid, boric acid or boric oxide. In place of sodium borohydride, other alkali metal borohydrides may be used such as potassium borohydride or lithium borohydride.

The invention is illustrated further by the following specific examples.

Example 1

9.5 moles t-butylamine, 0.5 mole of sodium borohydride and 0.5 mole of boric oxide were agitated at room temperature. 1.5 moles of water then was titrated into the mixture and hydrogen was evolved very slowly. Agitation was continued until evolution of hydrogen ceased and then the mixture was filtered. The filtrate was evaporated to dryness under vacuo. The solid residue was re-extracted with diethyl ether to obtain 19 grams of t-butylamine borane represented a yield of 43.8 percent of theory. The product had a melting point of 92–94° C. Analysis of the product showed it contained 3.26 percent hydrogen and 12.5 percent boron.

Example 2

Approximately 500 ml. of trimethylamine was condensed in a reaction flask at minus 20° C. and 0.25 mole of sodium borohydride and 0.25 mole of boric acid was added to it with agitation. The mixture was allowed to heat slowly to minus 5° C. and 15 ml. (0.83 mole) of water was titrated in with continued agitation. In about 5 hours evolution of hydrogen stopped and the mixture was allowed to warm to room temperature and filtered. The filtrate was evaporated under vacuo to remove excess trimethylamine. The solid residue was re-extracted with diethyl ether and 14 grams of trimethylamine borane was obtained representing a yield of 77% of theory. The solid product had a melting point of 92–93° C. It analyzed 3.95 percent hydrogen, 15.1 percent boron and 18.4 percent nitrogen.

Example 3

0.5 mole of sodium borohydride in 500 ml. of triethylamine was agitated at room temperature and a mixture of 0.5 mole of water and 21 ml. (0.372 mole) of acetic acid were titrated into the mixture. When hydrogen ceased to be evolved, the mixture was filtered and excess amine removed from the filtrate by evaporation in vacuo. The triethylamine borane weighed 38.5 grams representing a yield of 69.5 percent of theory.

Example 4

2.0 moles of trimethylamine, 0.5 mole of water and 0.25 mole of sodium borohydride were agitated at room temperature while bubbling in 0.25 mole of carbon dioxide. When evolution of hydrogen stopped, the mixture was filtered and excess amine removed from the filtrate by evaporation in vacuo. The solid residue of trimethylamine borane weighed 23 grams representing a yield of 80 percent of theory. The product analyzed 2.62 percent hydrogen, 9.32 percent boron and 12.1 percent nitrogen.

I claim:
1. The method for preparting tertiary amine boranes which consists of forming a mixture of an alkali metal borohydride, an acid and water in the presence of a tertiary amine, the molar ratio of acid to alkali metal borohydride used being not greater than about 1 to 1, the molar ratio of water to alkali metal borohydride used being not more than about 3 to 1, said acid being selected from the group consisting of formic acid, acetic acid, boric acid, boric oxide and carbon dioxide, said tertiary amine being selected from the group consisting of lower alkyl and lower cyclo-alkyl tertiary amines, agitating said mixture until evolution of hydrogen ceases thereby forming a reaction mixture comprising a solution of the amine borane of the selected tertiary amine in the selected ter- tiary amine containing a precipitate of a salt of an alkali metal and said acid, and recovering the amine borane from said reaction mixture, the molar ratio of tertiary amine to alkali metal borohydride being sufficiently greater than 1 to 1 to provide an excess of tertiary amine sufficient to dissolve the tertiary amine borane formed.

2. The method as claimed by claim 1 wherein said tertiary amine is a lower alkyl tertiary amine.

3. The method as claimed by claim 1 wherein said alkali metal borohydride is sodium borohydride.

4. The method as claimed by claim 1 wherein said alkali metal borohydride is potassium borohydride.

5. The method as claimed by claim 2 wherein said alkali metal borohydride is sodium borohydride.

6. The method as claimed by claim 2 wherein said alkali metal borohydride is potassium borohydride.

References Cited in the file of this patent

UNITED STATES PATENTS 2,938,923   Schechter et al. ---------- May 31, 1960

FOREIGN PATENTS 822,229   Great Britain ---------- Oct. 21, 1959

OTHER REFERENCES

Schaeffer et al.: JACS, vol. 71 pp. 2143–45, 1949.
Gaylord: "Reduction With Complex Metal Hydrides," p. 32, 1956.